(12) United States Patent
Ashe et al.

(10) Patent No.: US 6,771,220 B1
(45) Date of Patent: Aug. 3, 2004

(54) MEMORY EFFICIENT JAMMER LOCATOR FOR A DIGITAL ADAPTIVE BEAMFORMING RECEIVER

(75) Inventors: Jeffrey M. Ashe, Gloversville, NY (US); Richard C. Gaus, Jr., Burnt Hills, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/402,502

(22) Filed: Mar. 28, 2003

(51) Int. Cl.[7] .................................................. G01S 5/02
(52) U.S. Cl. ............................ 342/417; 342/14; 342/16
(58) Field of Search ............................ 342/417, 14, 16

(56) References Cited

U.S. PATENT DOCUMENTS

| | | | |
|---|---|---|---|
| 4,649,394 A | 3/1987 | Minker et al. | |
| 4,780,719 A | 10/1988 | Frei et al. | |
| 5,359,329 A | 10/1994 | Lewis et al. | |
| 5,940,033 A | 8/1999 | Locher et al. | |
| 5,955,987 A * | 9/1999 | Murphy et al. | 342/357.06 |
| 6,084,540 A | 7/2000 | Yu | |
| 6,509,865 B2 * | 1/2003 | Takai | 342/158 |

* cited by examiner

Primary Examiner—Theodore M. Blum
(74) Attorney, Agent, or Firm—Tarolli, Sundheim, Covell & Tummino L.L.P.

(57) ABSTRACT

A method and computer program product are disclosed for locating signal jammers in a digital beamforming receiver having an antenna with a plurality of associated antenna orientations. An associated antenna gain value is calculated for a first of a sequence of the plurality of antenna orientations at each of a series of sample points. The antenna gain values from the first antenna orientation are evaluated for null spaces to obtain a set of candidate null locations. Associated antenna gain values are calculated and evaluated for subsequent antenna orientations only at the set of candidate null locations. Candidate null locations are eliminated from the set after any evaluation in which they are not found to be null spaces.

22 Claims, 4 Drawing Sheets

MEMORY EFFICIENT JAMMER LOCATOR FOR A DIGITAL ADAPTIVE BEAMFORMING RECEIVER

BACKGROUND OF THE INVENTION

1. Technical Field

This invention relates to a digital beamforming receiver, such as global positioning system receiver, and more specifically to a system and method for precisely locating jamming signals from existing system data.

2. Description of the Prior Art

A global positioning system (GPS) receiver receives satellite signals transmitted from several of a set of GPS satellites, which are circling around the globe, and analyzes the received satellite signals to calculate the distance between each GPS satellite and the GPS receiver itself. Then, it calculates its current position from the calculated distances.

Where GPS systems are used in hostile environments, their reliance on data from multiple satellite sources makes them vulnerable to interference from a signal jammer. A signal jammer relies on the use of an active transmitter that overwhelms the receiver or feeds it false information. Such jamming signals can be the result of natural interference, or they can be artificially created with the intent of confusing the GPS system. Modern systems incorporate autonomous jammer nulling techniques, which allow the array antenna to be controlled by an autonomous system dedicated to the reduction of the jamming signal from a single jammer. These systems can decrease the influence of jammers on the system without excessively deforming the main or target detection beam.

While these autonomous systems work to neutralize the effects of the jamming signal, they do not precisely locate the jammer signal. Often, such information will be useful, as it facilitates the identification of the jamming source, allowing measures to be taken to neutralize the jamming. For example, in a military application it will be important to know where a jammer is located and whether it is hostile or inadvertent. Accordingly, a method for determining the location of a jammer source to a required degree of precision from data already provided by the autonomous jamming reduction systems would be desirable.

SUMMARY OF THE INVENTION

In accordance with one aspect of the present invention, a method is disclosed for locating signal jammers in a digital beamforming receiver having an antenna with a plurality of associated antenna orientations. An associated antenna gain value is calculated for a first of a sequence of the plurality of antenna orientations at each of a series of sample points. The antenna gain values from the first antenna orientation are evaluated for null spaces to obtain a set of candidate null locations. Associated antenna gain values are calculated and evaluated for subsequent antenna orientations only at the set of candidate null locations. Candidate null locations are eliminated from the set after any evaluation in which they are not found to be null spaces.

In accordance with another aspect of the invention, a computer program product is disclosed for locating signal jammers in a digital beamforming receiver having an antenna with a plurality of associated antenna orientations. An estimation routine calculates an associated antenna gain value for a first of a sequence of the plurality of antenna orientations at each of a series of sample points. A coarse search routine evaluates the antenna gain values from the first antenna orientation for null spaces to obtain a set of candidate null locations. The estimation routine and the coarse search routine calculate and evaluate associated antenna gain values for subsequent antenna orientations only at the set of candidate null locations. A candidate null location is eliminated from the set after any evaluation in which it is not found to be a null space.

In accordance with a further aspect of the invention, a method is disclosed for locating a jammer within a defined region. The region is first subdivided into smaller subregions. The subregion with the lowest antenna gain is selected by calculating antenna gain values at one or more representative points within the subregions. The region is replaced with the selected subregion, and the process is iteratively repeated until a termination event occurs.

In accordance with a further aspect of the invention, a computer program product is disclosed for locating a jammer within a defined region. A fine search routine iteratively performs a sequence of functions until the occurrence of a termination event. In each iteration, the region is subdivided into smaller subregions. The subregion with the lowest antenna gain is selected for an associated antenna by calculating antenna gain values at one or more representative points within the subregions. The region is then replaced with the selected subregion.

In accordance with yet another aspect of the invention, a system for locating signal jammers in a digital beamforming system having an antenna with a plurality of associated antenna orientations is disclosed. The system includes a central processing unit that calculates an associated antenna gain value for a first of a sequence of the plurality of antenna orientations at each of a series of sample points. The central processing unit then evaluates the antenna gain values from the first antenna orientation for null spaces to obtain a set of candidate null locations. The system further includes a working memory that stores the candidate null locations. The central processing unit calculates and evaluates an associated antenna gain for subsequent antenna orientations only at the set of candidate null locations. Candidate null locations are eliminated from the set after any evaluation in which they are not found to be a null space.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 3($b$) continues the flow diagram of 3($a$); and

FIG. 3($c$) continues the flow diagram of FIGS. 3($a$) and 3($b$).

DETAILED DESCRIPTION OF THE DRAWINGS

The present invention addresses the problem of locating signal jammers in a digital beamforming system. The present system and method utilize existing information generated by prior art automated jamming reduction systems to precisely locate the direction of the jamming signal. While the system is explained as part of a global positioning system for illustrative purposes, it may also be applied to a radar system or any digital beamforming system without departing from the spirit of the invention.

One embodiment of the present invention may be implemented as a computer program operative within a computer processor located within the digital beamforming system. In this embodiment, the structures described herein may be considered to refer to individual modules and tasks within these programs.

The jammer location system of the present invention is intended to be incorporated within a digital beamforming receiver. Such a receiver will have a multi-element antenna for receiving signals from external sources. In the example embodiment of a Global Positioning System (GPS), the antenna receives digital signals from one or more spacecraft.

The antenna of the digital beamforming receiver is a multi-element array antenna, capable of assuming a plurality of antenna orientations according to a control portion of the system. By antenna orientation, it is meant a configuration of the antenna elements as to focus its reception of signals predominantly from a single direction. The line traced along this direction from the antenna to the target is referred to as an "antenna beam."

The digital beamforming receiver will also contain one or more autonomous jammer nullification systems. These systems detect jamming signals and configure the antenna to an orientation that presents a region of low antenna gain in the direction of the jammer. This configuration can be represented by a series of digital beamforming coefficients as is discussed further below.

Figure 1:
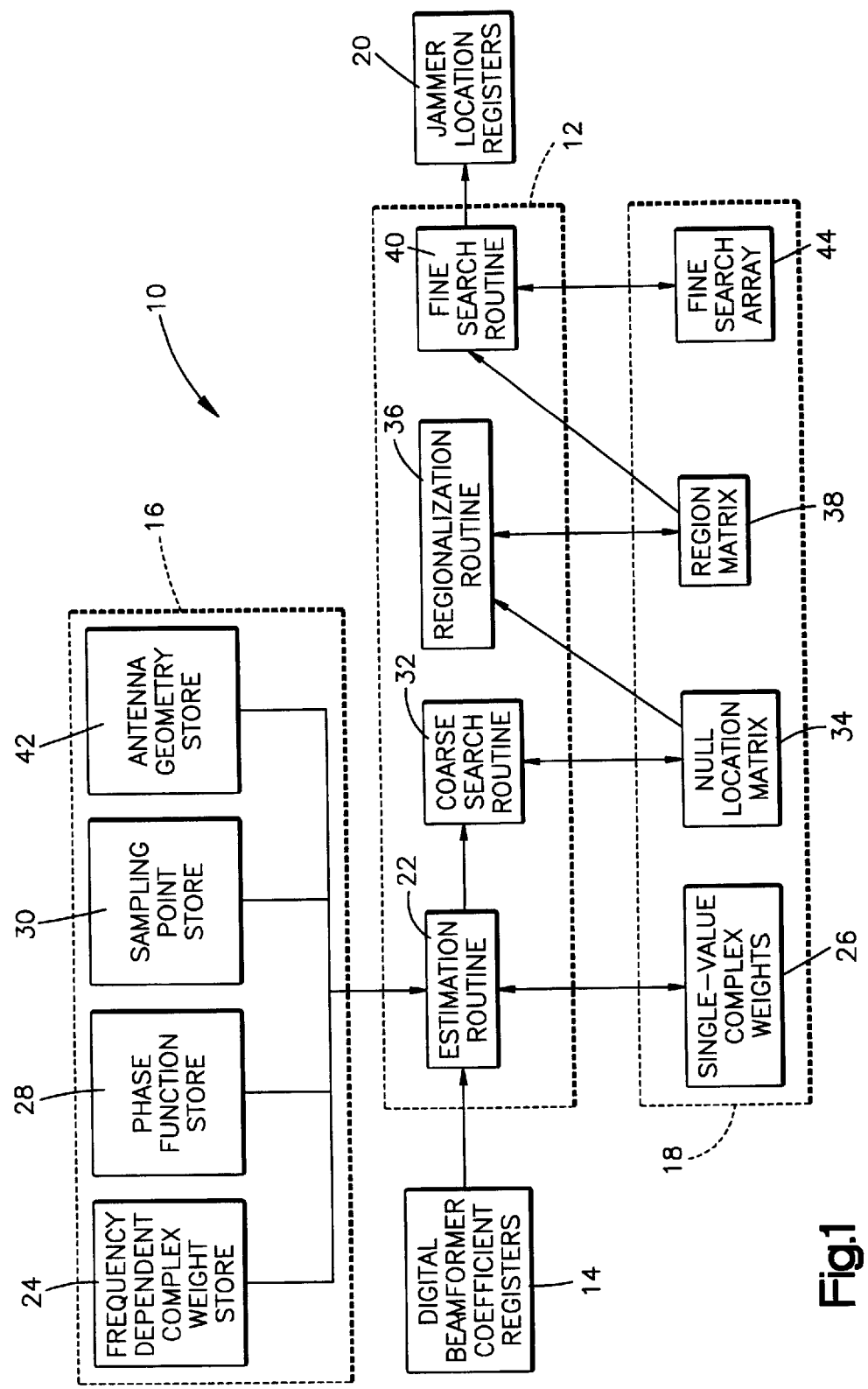
FIG. 1 is a functional block diagram of the jammer location system of the present invention.

FIG. 1 is a functional block diagram of the jammer location system 10 of the present invention. In its simplest form, a central processing unit (CPU) 12 accesses data from a series of digital beamforming sweeps stored in a series of digital beamformer coefficient registers 14. Stored data in a read only memory 16 is accessed to calculate an antenna gain pattern and determine candidate locations for antenna nulls. These search locations are stored in a working memory 18. The CPU searches the candidate locations to find null spaces common to each of the sweeps within the series. The area around these regions is then iteratively searched for the area of lowest antenna gain. These minimum areas are determined to be the jammer locations, and the locations are stored in a series jammer location registers 20 for output.

Turning to the specifics of the invention, the system 10 receives the input of a series of digital beamforming coefficients at a register 14. Each set of the coefficients is generated by the digital beamforming system in response to signal data received at a plurality of antenna elements at a particular orientation of the antenna. These antenna orientations are intended to extend the receptivity of the antenna in a particular direction, and the orientations will henceforth be referred to alternatively as antenna beams.

The digital beamforming coefficients are created as the result of the operation of automated adaptive nullers (not shown) within the digital beamforming system. The adaptive nullers create nulls in the antenna pattern in a direction associated with a potential signal jammer. These automated adaptive nullers operate on received digital signals to produce weight information used to adjust the antenna beam pattern to display a null in the direction of the potential jammer. A set of digital beamforming coefficients is adapted from these weights.

The set of digital beamforming coefficients corresponding to each antenna element varies with frequency, but they can be selectively collapsed across frequencies to obtain a set of frequency-independent values. To accomplish this, an estimation routine 22 performed by the CPU 12 multiplies the frequency-varying coefficients associated with each antenna element by a corresponding set of frequency-dependent complex weights, retrieved from a store 24 within the coefficient memory 16, and sums the products to produce a set of frequency-independent single value complex weights. Sets of single value complex weights is stored in a store 26 within the working memory 18 for each antenna beam.

The single value complex weights are then applied to a phase function for each antenna element to obtain an antenna gain pattern for each antenna beam. The phase function for each antenna element at a predetermined set of sampling points is known and can be retrieved from a store 28 within the coefficient memory 16. In the example embodiment, the single value complex weights for each antenna element are multiplied by a predetermined phase function value at each sampling point, and the products are summed. This produces a value for the antenna gain at each sample point, and these values are stored in the working memory 18. In a preferred embodiment, a circular antenna array is used and the phase function is stored in a reduced form conserve memory. The values of the phase function corresponding to each of N sampling points are stored as an N×1 matrix. The phase function values corresponding to a particular element can be retrieved by choosing a starting point corresponding to a particular sampling point and cycling through the phase function values in sequence. The array may be further reduced to a set of points corresponding to only one full azimuthal sweep, as opposed to retaining the phase values over multiple cycles. This arrangement takes advantage of the periodic nature of the circular antenna array.

The calculated antenna gain values for the first antenna beam are then "searched" by comparing the values calculated for each sample point with a predetermined threshold. The sample points are identified by azimuthal angle and elevation angle. These points are referenced from a memory store 30 within the ROM 16. The position of the points can also be translated to x-y coordinates in sine-space, with the azimuth represented as tx, and the elevation represented as ty. Since values are only required for a preliminary coarse search, it is possible to reduce the time necessary for the search by using a reasonably large interval between successive sample points. The necessary spacing between these points can be determined via experimentation.

Initially, the system performs a coarse search. A coarse search routine 32 performed by the CPU 12 searches the antenna gain values at the predetermined sample points for nulls in the antenna gain pattern. A null space, or null, is defined for the purposes of this system as a sample point where the value of the antenna gain falls below a threshold value. This threshold can be an absolute value of the gain or a relative value, such as a number of decibels the signal falls below a maximum computed gain. In an example embodiment, the threshold value is calculated as twenty decibels below the maximum computed gain.

The locations of the null spaces in the first antenna beam are saved to memory as a null location matrix 34 and used as a set of sample points for the second antenna beam. The determined nulls reflect the set of potential jammer locations that will be analyzed, and will be referred to as candidate null locations. An antenna gain value is calculated for each of the candidate null locations stored in the null location matrix, and the values are evaluated for antenna nulls. Any candidate null locations not found to be null spaces in the antenna gain pattern for the second beam are eliminated from the null location matrix 34. This process continues for all of the antenna beams, with the antenna gain values for each new antenna beam calculated and evaluated only at the candidate null locations found to be null points by the preceding antenna beam. At the end of the process, only those candidate null locations that reflect antenna gain nulls located in every beam will remain in the null location matrix 34.

The above search pattern is designed to eliminate natural or temporary nulls in order to locate those nulls produced in response to an external jammer. Each of the antenna orientations will have one or more naturally occurring sidelobes, which produce a null value for the antenna gain. It is unlikely, however, that naturally occurring sidelobe nulls of the antenna orientations will overlap. Obviously, this likelihood will decrease sharply with increasing numbers of antenna orientations available for analysis. Accordingly, the locations at which all antenna beams experience a common null is very likely to reflect a response to an external influence, such as a jammer.

A regionalization routine 36 performed by CPU 14 then organizes the candidate null locations into candidate jammer regions according to their proximity. The first candidate null location is treated as an initial anchor point of a set of anchor points, each defining a candidate jammer region. All successive candidate null locations are compared to this set of anchor points. If a candidate null location is within a threshold distance of an anchor point, it becomes part of the region defined by that anchor point. If the candidate null location does not fall within the threshold distance of any anchor point, that null location is defined to be an anchor point for a new region. The anchor points defining these candidate jammer regions are saved as a region matrix 38 in the working memory 18.

The results of the regionalization are inputted to a fine search routine 40 performed by the CPU. The boundaries of each candidate jammer region are established by computing the minimum and maximum values of the x and y coordinates of each of the points incorporated into the region. The newly defined regions are then searched for a minimum antenna gain value for each antenna beam.

Figure 2:
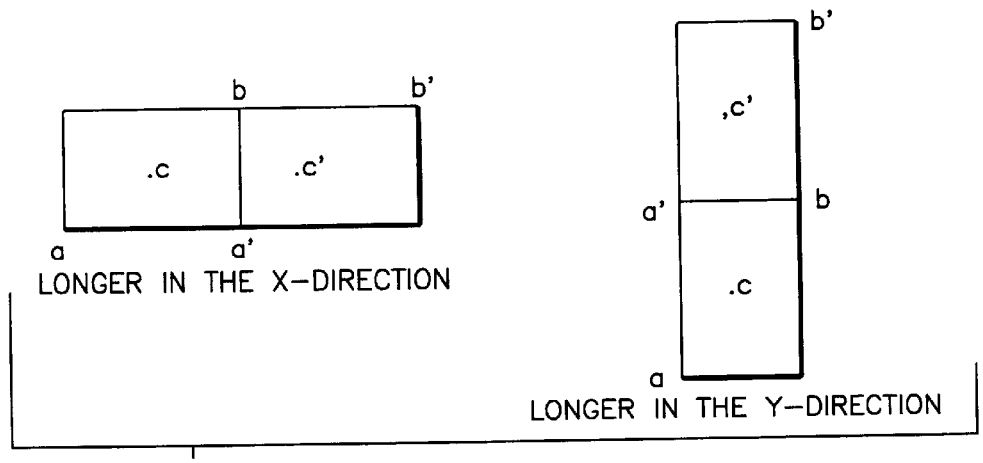
FIG. 2 illustrates the division of a search region into subregions, with the centroids and corners indicated.

During the fine search, each region is subdivided into either two or four rectangular subregions. When the region is divided into two subregions, the original region divided in half along its longest dimension. This division is illustrated in FIG. 2. Dividing the region into four subregions involves dividing the original region in half across each dimension. The use of additional subregions results in greater precision at the cost of increased processing time.

Regardless of the number of subregions utilized, a centroid is found for each subregion, and the antenna gain value associated with at least one of the antenna beams is evaluated at that point. The antenna gain values may be computed using the stored single value complex weights for the selected antenna beam(s) and antenna geometry data retrieved from a store 42 in the ROM 16. The antenna gain values are compared, and the subregion having the centroid with the lowest value is selected for further searching.

This subregion is then further divided into subregions, which are evaluated to select yet another search region. The process proceeds iteratively until a termination event occurs. Termination events can include one or more of the performance of a set number of iterations, a predetermined period of time, or the attainment of a desired degree of precision in the jammer location (i.e. the attainment of a search region with sufficiently small area). Upon termination, the results are saved within a fine search array 44 in the working memory 18.

Variations can exist within the iterative search. In one alternate embodiment, the antenna gain value is measured at each corner of the subregions as well as the centroid. The subregion having the lowest value at any point is selected as the next search region. In a second alternate embodiment, a gradient search may be performed to find the minimum value of the antenna gain.

In yet another embodiment, the fine search is conducted in each region using antenna gain values associated with each antenna beam to produce a set of slightly varying approximate jammer locations for each search region. The approximate jammer location determined for each beam can be expressed as the centroid of the final subregion established in the fine search. A more accurate approximation of the jammer location can be provided by calculating the centroid of these approximate locations to obtain a single value averaged across the beams. This result is output to a jammer location register 20.

Figure 3A:
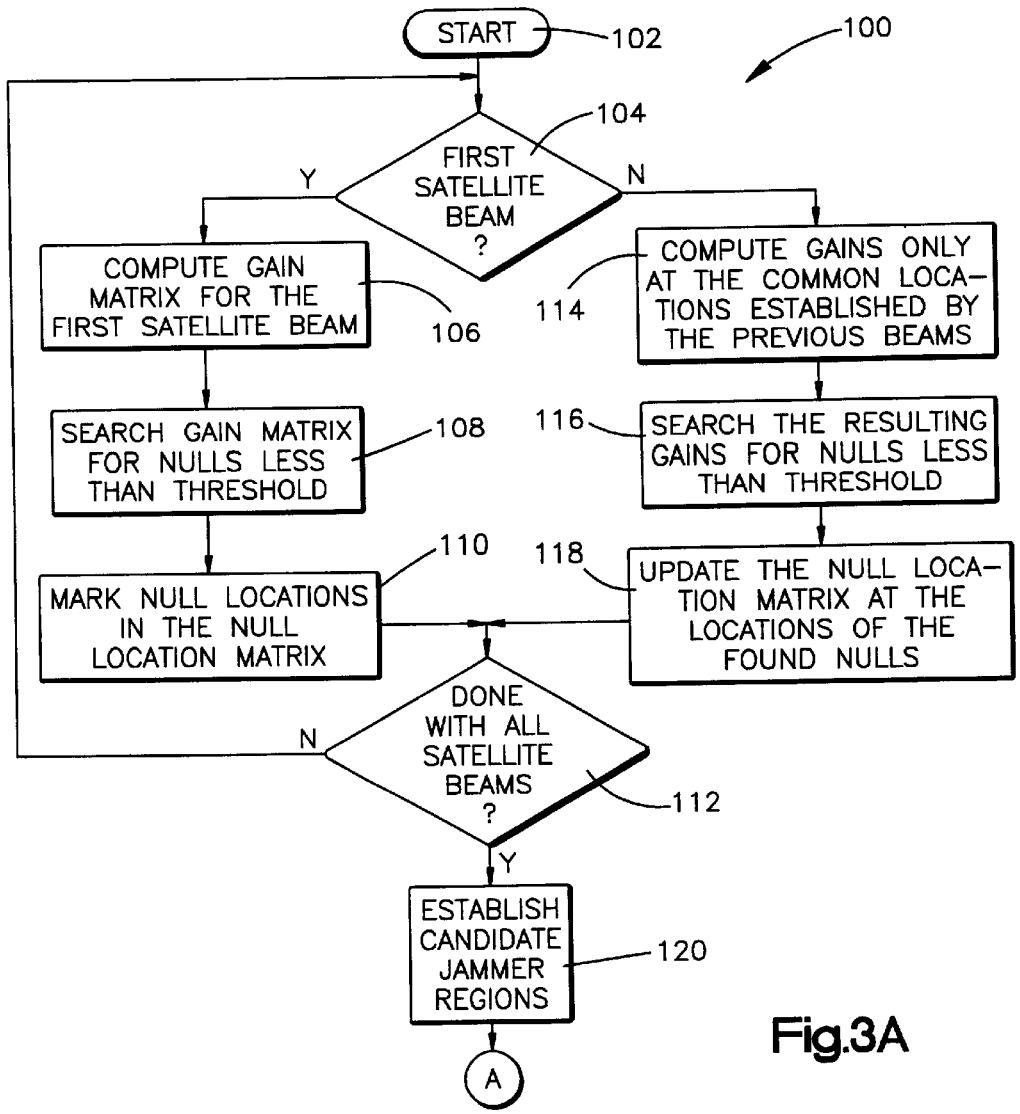
FIG. 3($a$) is the first part of a flow diagram illustrating the run-time operation of the jammer location system.
Figure 3B:
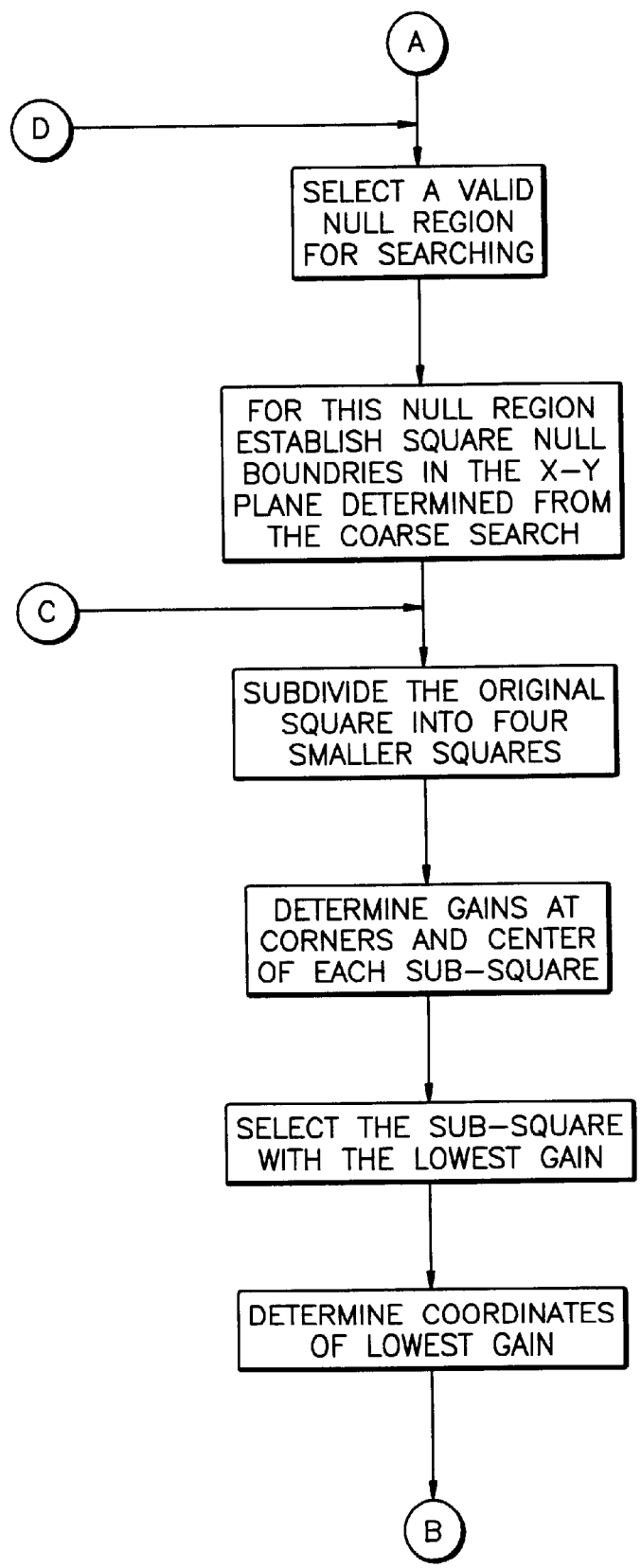
Figure 3C:
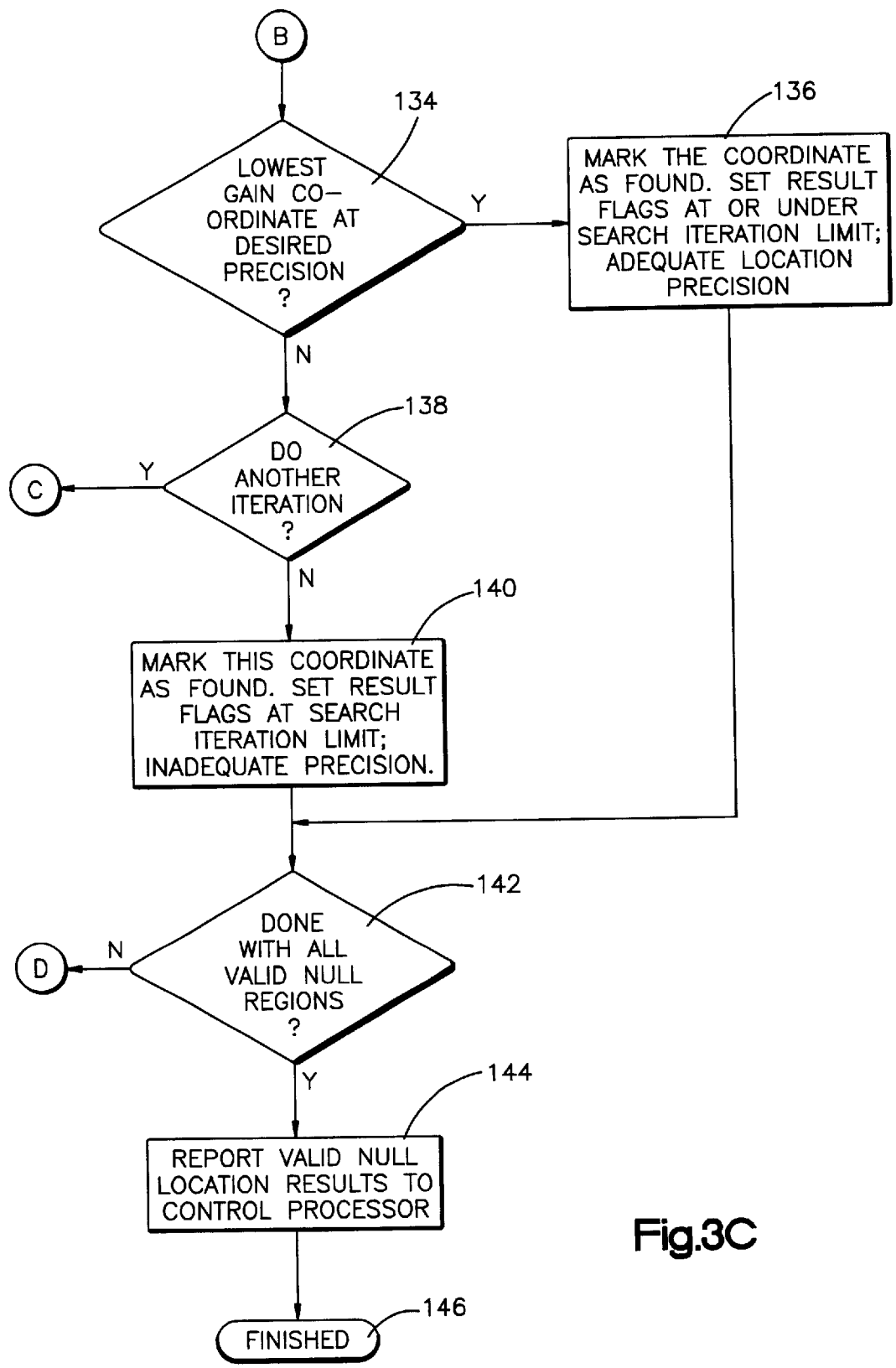

FIG. 3 illustrates the run-time operation of the jammer location system in an example embodiment of a global positioning system. The system begins at step 102. At step 104, the system determines if the satellite beam it is analyzing is the first of the series of beams to be analyzed. By satellite beam, it is meant the signal received by an antenna element aimed at a global positioning satellite. If the processed beam is the first such signal analyzed, the process continues to step 106, where a gain matrix is computed for the beam. At step 108, the gain matrix is searched for values of the antenna gain that fall below a predetermined threshold gain value. The locations at which subthreshold values are found will be referred to hereinafter as nulls. The locations of these nulls are recorded in a null location matrix as candidate null locations at step 110.

After the nulls have been located, the process advances to step 112, where it is determined whether more satellite beams remain to be processed. If more beams remain, the process returns to step 104. Since the process is returning to 104 after the analysis of a first satellite beam, the determination at step 104 will indicate that the new satellite beam is not the first in the series. The process will then advance to step 114. At step 114, the system again computes antenna gain values for the satellite beam, but only at those locations determined to be nulls by previous satellite beams. Only those nulls that are common to all of the satellite beams are relevant in the analysis. Thus, the system can safely omit any previously scanned location where a null has not been found from later scans.

At step 116, the system searches the computed antenna gain values for nulls, nulls being values less than the predetermined gain threshold. The process then proceeds to step 118, where the null location matrix is updated at the locations of the found nulls. Thus, after each scan, only those locations found as nulls will remain in the null location matrix, and only those remaining locations will be searched by subsequent beams. After the null location matrix is updated, the system returns to step 112 to determine if further satellite beams remain to be processed. The system continues to cycle between steps 104 and 112–118 until all of the satellite beams have been analyzed.

After all of the beams have been analyzed, the coarse search procedure ends. Those points which are determined to represent null spaces for all of the antenna beams will be retained as candidate null locations. At step 120, the system establishes candidate jammer regions. To establish the candidate jammer regions, the system proceeds in order through the candidate null locations, establishing each candidate null location not within a threshold distance of an anchor point as a separate anchor point. Candidate null locations within a threshold distance of an anchor point are joined to the region of the anchor point. At step 122, one of the established candidate jammer regions is selected for searching. At step 124, the boundaries of the region are established. The boundaries are rectangles in sine space, with sides corresponding to the minimum and maximum values of the null spaces within that region on the x and y axes.

The fine search procedure begins at step 126. At step 126, the defined region is subdivided into four smaller rectangles. Alternately, the region could be divided into two smaller rectangles, hastening the search process, but leading to a less accurate result. At step 128, the gain value is determined at the centroid and corners of each of the smaller rectangles. At step 130, the rectangle with the lowest overall gain is determined. This can be accomplished by summing the gain values over the four points, taking the rectangle containing the lowest overall point, or by simply selecting the rectangle with the smallest centroid. The selected region is searched for its coordinates of lowest gain at step 132. At this point, it is merely determined which of the points calculated above produces the smallest antenna gain value.

The process continues at step 134, where the system determines whether the point of lowest gain has been determined with sufficient precision. If it has, the search terminates and the coordinates of the jammer in this region are considered found. The result is flagged at step 136 to indicate that the jammer was found with adequate precision and the process advances to step 142. If the location is not known with sufficient precision, the system determines at step 138 whether more iterations should be performed. A predetermined number of iterations are allowed for the fine search process in each region. If the system has not passed this limit, the process returns to step 126 to begin a new iteration of the fine search process. If the limit has been reached, the jammer is considered found, but is flagged at step 140 to indicate that the location was not determined with sufficient precision. The process then advances to step 142.

At step 142, the system determines whether additional null regions remain to be searched. If so, the process returns to step 122, where another region is defined and searched. If no null regions remain, the process advances to step 144, where the null location results are output to the central processing unit. The output includes the location, a logical variable indicating whether the location was determined at or under the search limit, and whether the location was determined with sufficient precision. The process then terminates at step 146.

It will be understood that the above description of the present invention is susceptible to various modifications, changes and adaptations, and the same are intended to be comprehended within the meaning and range of equivalents of the appended claims. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

Having described the invention, we claim:

1. A method for locating signal jammers in a digital beamforming receiver having an antenna with a plurality of antenna orientations, comprising:

calculating an associated antenna gain value for a first of a sequence of the plurality of antenna orientations at each of a series of sample points;

evaluating the antenna gain values from the first antenna orientation for null spaces to obtain a set of candidate null locations; and calculating and evaluating associated antenna gain values for subsequent antenna orientations only at the set of candidate null locations, where a candidate null location is eliminated from the set after any evaluation in which it is not found to be a null space.

2. A method as set forth in claim 1, wherein the method includes an iterative search for a jammer location comprising:

establishing at least one candidate jammer region around one or more candidate null locations remaining after antenna gain values have been evaluated for all antenna orientations; and iteratively repeating the following steps until the occurrence of a termination event:

subdividing the candidate jammer region into smaller subregions;

selecting the subregion with the lowest antenna gain by calculating antenna gain values at one or more representative points within the subregions; and replacing the candidate jammer region with the selected subregion.

3. A method as set forth in claim 2, wherein the iterative search is conducted at each candidate jammer region for each antenna orientation, using its associated antenna gain, to obtain a plurality of approximate jammer locations within the candidate jammer region, and the method includes the additional step of finding the centroid of the plurality of approximate jammer locations.

4. A method as set forth in claim 1, wherein the associated antenna gain values for the sequence of antenna orientations are calculated using precalculated information stored in a memory and data received at a plurality of antenna elements for each antenna orientation.

5. A method as set forth in claim 4, wherein the precalculated information includes a series of sampling points and a set of values for an associated phase function for each of a plurality of antenna elements corresponding to the series of sampling points.

6. A method as set forth in claim 4, wherein the sets of phase functions values are stored in sequence as an array of values, each value corresponding to one of the series of sampling points, and values for a particular antenna element are retrieved by starting at the value corresponding to a sampling point associated with that antenna element and retrieving the remaining values in sequence.

7. A method as set forth in claim 4, wherein the data received at each antenna element comprises a plurality of beamformer coefficients that vary with frequency, the precalculated information includes a set of frequency dependent complex weights, and calculating the antenna gain values includes applying the frequency dependent complex weights to the received beamformer coefficients to obtain a frequency-independent values for each antenna element.

8. A method as set forth in claim 1, wherein the method further includes:

establishing at least one candidate jammer region around one or more candidate null locations; and searching each of the established candidate jammer regions via an iterative gradient search.

9. A computer program product for locating signal jammers in a digital beamforming receiver having an antenna with a plurality of associated antenna orientations, comprising:

an estimation routine that calculates an associated antenna gain value for a first of a sequence of the plurality of antenna orientations at each of a series of sample points;

a coarse search routine that evaluates the antenna gain values from the first antenna orientation for null spaces to obtain a set of candidate null locations;

characterized in that the estimation routine and the coarse search routine calculate and evaluate associated antenna gain values for subsequent antenna orientations only at the set of candidate null locations, where a candidate null location is eliminated from the set after any evaluation in which it is not found to be a null space.

10. A computer program product as set forth in claim 9, wherein the computer program product further includes the following:

a regionalization routine that establishes at least one candidate jammer region around one or more candidate null locations remaining after antenna gain values have been evaluated for all antenna orientations; and a fine search routine that iteratively performs the following sequence of functions until the occurrence of a termination event:
subdividing the candidate jammer region into smaller subregions;
selecting the subregion with the lowest antenna gain by calculating antenna gain values at one or more representative points within the subregions; and
replacing the candidate jammer region with the selected subregion.

11. A method of locating a jammer within a defined region, said method comprising:

iteratively repeating the following steps until the occurrence of a termination event:
subdividing the region into smaller subregions;
selecting the subregion with the lowest antenna gain for an associated antenna by calculating antenna gain values at one or more representative points within the subregions; and
replacing the region with the selected subregion.

12. A method as set forth in claim 11, wherein the region is defined by the location of one or more candidate null locations associated with one or more antenna gain patterns.

13. A method as set forth in claim 12, wherein the candidate null locations are determined by the following process:

calculating an associated antenna gain value for a first of a sequence of antenna orientations at each of a series of sample points;

evaluating the antenna gain values from the first antenna orientation for null spaces to obtain a set of candidate null locations; and calculating and evaluating associated antenna gain values for subsequent antenna orientations only at the set of candidate jammer locations, where a candidate null location is eliminated from the set after any evaluation in which it is not found to be a null space.

14. A method as set forth in claim 11, wherein the one or more representative points include the centroid of each subregion.

15. A method as set forth in claim 11, wherein each region is divided into four subregions.

16. A computer program product for locating a jammer within a defined region, comprising:

a fine search routine that iteratively performs the following sequence of functions until the occurrence of a termination event:
subdividing the region into smaller subregions;
selecting the subregion with the lowest antenna gain for an associated antenna by calculating antenna gain values at one or more representative points within the subregions; and
replacing the region with the selected subregion.

17. A computer program product as set forth in claim 16, wherein the region is defined by the location of one or more candidate null locations associated with one or more antenna gain patterns, and the candidate null locations are determined by:

an estimation routine that calculates an associated antenna gain value for a first of a sequence of antenna orientations at each of a series of sample points; and a coarse search routine that evaluates the antenna gain values from the first antenna orientation for null spaces to obtain a set of candidate null locations;

characterized in that the estimation routine and the coarse search routine calculate and evaluate associated antenna gain values for subsequent antenna orientations only at the set of candidate jammer locations, where a candidate null location is eliminated from the set after any evaluation in which it is not found to be a null space.

18. A system for locating signal jammers in a digital beamforming system having an antenna with a plurality of associated antenna orientations, comprising:

a central processing unit that calculates an associated antenna gain value for a first of a sequence of the plurality of antenna orientations at each of a series of sample points and evaluates the antenna gain values from the first antenna orientation for null spaces to obtain a set of candidate null locations; and a working memory that stores the candidate null locations;

characterized in that the central processing unit calculates and evaluates associated antenna gain values for subsequent antenna orientations only at the set of candidate null locations, and further characterized in that a candidate null location is eliminated from the set after any evaluation in which it is not found to be a null space.

19. A system as set forth in claim 18, wherein the central processing unit establishes at least one candidate jammer region around one or more candidate null locations remaining after antenna gain values have been evaluated for all antenna orientations and iteratively searches each of these candidate jammer regions.

20. A system as set forth in claim 19, wherein the iterative search of a candidate jammer region includes:

iteratively repeating the following steps until the occurrence of a termination event:
subdividing the candidate jammer region into smaller subregions;
selecting the subregion with the lowest. antenna gain by calculating antenna gain values at one or more representative points within the subregions; and
replacing the candidate jammer region with the selected subregion.

21. A system as set forth in claim 20, wherein the candidate jammer region is divided into two subregions.

22. A system as set forth in claim 20, wherein the representative points include one or more of the corners of each subregion.

* * * * *